(12) United States Patent
Nagai

(10) Patent No.: US 6,296,237 B1
(45) Date of Patent: Oct. 2, 2001

(54) BUMP STOPPER

(75) Inventor: Hiroaki Nagai, Komaki (JP)

(73) Assignee: Tokai Rubber Industries, Ltd. (JP)

(*) Notice: Subject to any disclaimer, the term of this patent is extended or adjusted under 35 U.S.C. 154(b) by 0 days.

(21) Appl. No.: 09/439,428

(22) Filed: Nov. 15, 1999

(30) Foreign Application Priority Data

Nov. 24, 1998 (JP) .................................................. 10-332891

(51) Int. Cl.$^7$ .................................. F16F 9/58; F16F 1/36; B60G 7/04
(52) U.S. Cl. ........................ 267/220; 267/140.3; 267/292; 267/153; 267/140
(58) Field of Search .................................. 267/220, 139, 267/140, 152, 153, 292–294, 219, 140.3, 122, 33, 35, 142–145, 141–141.7, 3; 248/658, 634, 635, 621, 573, 551; 280/124.177, 124.155, 124.162; 114/219; 405/212; 293/120; 16/86 A; 296/207

(56) References Cited

U.S. PATENT DOCUMENTS

| | | | |
|---|---|---|---|
| 3,762,694 | * 10/1973 | MacDonnell | 267/33 |
| 3,824,649 | * 7/1974 | Kempf | 16/86 A |
| 4,462,608 | 7/1984 | Lederman . | |
| 4,804,169 | 2/1989 | Hassan . | |
| 4,805,886 | * 2/1989 | Hassan | 267/33 |
| 5,052,665 | 10/1991 | Sakuragi . | |
| 5,149,069 | * 9/1992 | Hein | 267/33 |
| 5,158,269 | 10/1992 | Hein et al. . | |
| 5,238,233 | * 8/1993 | Hein | 267/153 |
| 5,257,730 | 11/1993 | Nakaura . | |
| 5,275,389 | * 1/1994 | Pinch et al. | 267/33 |

FOREIGN PATENT DOCUMENTS

| | | | |
|---|---|---|---|
| 89042 | * 4/1991 | (JP) | 267/220 |
| 117736 | * 5/1991 | (JP) | 267/220 |
| 00-161419 | * 6/2000 | (JP) . | |

* cited by examiner

Primary Examiner—Douglas C. Butler
(74) Attorney, Agent, or Firm—Burr & Brown

(57) ABSTRACT

A bump stopper for elastically limiting an amount of operation of a suspension system of a vehicle, including a rigid holding member which includes a hollow holding portion opening toward the other suspension member, a spring member which is formed of a foamed elastic material and which includes a base end portion held by the hollow holding portion of the holding member and also includes a free end portion projecting away from the holding portion toward the other suspension member, and a stopper rubber which projects from an end surface of the hollow holding portion of the holding member toward the other suspension member such that a free end surface of the stopper rubber is more distant from the other suspension member than a free end surface of the spring member.

9 Claims, 6 Drawing Sheets

BUMP STOPPER

BACKGROUND OF THE INVENTION

1. Field of the Invention

The present invention relates to a bump stopper which is employed in a suspension system of a vehicle, for elastically limiting the amount of operation of the suspension system.

2. Related Art Statement

There is known a bump stopper which is formed of an elastic material and which is employed in, e.g., a suspension system of an automotive vehicle, for limiting elastically a stroke amount of a wheel which is elastically supported such that the wheel is movable relative to the vehicle's body, or assisting the suspension system in supporting elastically the wheel. The bump stopper is provided solely between two suspension arms, or between a suspension arm and the body, or is externally fitted on a piston rod of a shock absorber. The bump stopper is required, for the purpose of simultaneously meeting high ride quality and high stability and controllability, to have a non-linear spring characteristic wherein the stopper is soft while the amount of operation of the suspension system is small but it changes to be hard, once the operation amount exceeds a reference amount, so as to limit reliably the operation amount around the reference amount.

To this end, there has been proposed a bump stopper which includes a generally cylindrical spring member having a low spring constant and a rigid restraint ring externally fitted on, and fixed to, an outer circumferential surface of an axially intermediate portion of the spring member. The restraint ring may be formed of resin. In this bump stopper, the restraint ring prevents the spring member from elastically swelling radially outwardly. In addition, when the amount of compression of the spring member exceeds a reference mount, the restraint ring butts against another rigid member and accordingly the movement of the ring is limited by that rigid member. Consequently, the spring characteristic of the bump stopper changes to be much harder to limit effectively the amount of elastic deformation of the spring member and accordingly the amount of operation of the suspension system.

However, in the above-identified bump stopper, the elastic deformation of the spring member is locally or non-uniformly limited by the restraint ring. Therefore, when the spring member is elastically deformed and the amount of elastic deformation increases, stresses are likely to be concentrated at the position where the restraint ring is provided. Thus, the durability of the spring member is lowered.

In the case where the restraint ring frequently butts against the rigid member upon inputting of a large load to the suspension system, or in the case where the ring butts with a great force or energy against the rigid member, the durability of the ring or the rigid member is also lowered. If the restraint ring breaks, the bump stopper cannot effectively limit the amount of elastic deformation of the spring member, so that the stability and controllability of the vehicle may be significantly lowered.

SUMMARY OF THE INVENTION

It is therefore an object of the present invention to provide a bump stopper which enjoys a high durability, exhibits a non-linear spring characteristic, and effectively and stably limits the amount of operation of a suspension system.

The present invention provides a bump stopper which has one or more of the technical features that are described below in respective paragraphs (1) to (9). Any feature which includes another feature shall do so by referring to the paragraph number given to that feature. Thus, two or more of the following features may be combined, if appropriate. Although each feature may be accompanied by a supplemental explanation where appropriate the following features and the appropriate combinations thereof are just examples to which the present invention is by no means limited.

(1) According to a first feature of the present invention, there is provided a bump stopper for elastically limiting the amount of operation of a suspension system of a vehicle. The bump stopper is provided between two suspension members of the suspension system which are moved toward, and away from, each other upon operation of the suspension system. The bump stopper comprises a rigid holding member which is attached to one of the two suspension members and which includes a hollow holding portion opening toward the other suspension member; a spring member which is formed of a foamed elastic material and which includes a base end portion held by the hollow holding portion of the holding member and also includes a free end portion projecting away from the holding portion toward the other suspension member; and a stopper rubber which projects from an end surface of the hollow holding portion of the holding member toward the other suspension member such that a free end surface of the stopper rubber is more distant from the other suspension member than a free end surface of the spring member, wherein when the other suspension member bumps against the free end surface of the spring member, the spring member is elastically deformed and compressed into an inside space of the stopper rubber, so that the other suspension member bumps against the free end surface of the stopper rubber.

The present bump stopper advantageously exhibits a non-linear spring characteristic wherein the spring characteristic remains soft while the operation amount of the suspension system is small and changes to be hard, once the operation amount exceeds a reference amount, so as to limit reliably the operation amount around the reference amount. Thus, the bump stopper functions as not only a stopper but also a shock absorber. While the load input to the suspension system remains small, the stopper rubber is not deformed by the other suspension member and only the spring member is deformed, i.e., compressed by the same. Thus, the bump stopper exhibits only the spring characteristic of the spring member. Meanwhile, once the input load exceeds a reference load, the amount of compression of the spring member exceeds a reference amount and accordingly the other suspension member bumps against the stopper rubber. Thus, both the spring member and the stopper rubber are compressed. Consequently the spring characteristic of the bump stopper changes non-linearly, i.e., changes to be much harder. Since the stopper rubber is provided on the end surface of the hollow holding portion of the rigid holding member, the bump stopper can elastically and reliably limit the amount of relative movement of the two suspension members. Since the amount of elastic deformation of the spring member is effectively limited, the spring member enjoys a high durability. In addition, since the spring member is formed of a foamed elastic material, the volume of the spring member is easily decreased when being compressed. Therefore, the spring member being compressed does not obstruct the other suspension member which is bumping against the free end surface of the stopper rubber. Since the spring member is compressed into the inside space of the stopper rubber, it does not interfere with other members.

(2) According to a second feature of the present invention that includes the first feature (1), the bump stopper further comprises a holding rubber layer which is formed on an inner surface of the hollow holding portion of the holding member and which has, on an inner surface thereof, either one of an engageable projection or an engageable recess, wherein the spring member has, on an outer surface thereof, the corresponding engageable projection or recess to engage with the projection and the recess so as to prevent the spring member from coming off the holding rubber layer.

In the present bump stopper, the spring member is fitted in the hollow holding portion of the holding member, so that the spring member is strongly held by the holding member. Since the holding rubber layer is provided on the inner surface of the hollow holding portion, the holding member may have a simple shape which can be easily produced. In addition, the holding rubber layer is easily provided with the engageable projection or the engageable recess for holding the spring member. The spring member need not be adhered to the holding member or the holding rubber layer. The respective shapes of the engageable projection and the engageable recess are not limited so long as they are engageable with each other to hold the spring member and prevent the same from coming off the holding member. The holding rubber layer may be formed integrally with the stopper rubber.

(3) According to a third feature of the present invention that includes the first or second feature (1) or (2), the holding member comprises a cylindrical metallic member having a bottom wall which supports an end surface of the base end portion of the spring member.

In the present bump stopper, the holding member can strongly and stably support the base end portion of the spring member. The metallic member may be formed by, e.g., drawing of a sheet metal. It is preferred that the metallic member includes a flange portion which has a shape like an annular disc, which extends radially outwardly from an open end of the cylindrical metallic member and which is formed integrally with the remaining portion of the metallic member. The stopper rubber is provided on the flange portion such that the stopper rubber projects toward the other suspension member. The bottom wall of the cylindrical metallic member may have a through-hole through which a bolt is screwed into the one suspension member so as to attach the metallic member to the one member.

(4) According to a fourth feature of the present invention that includes any one of the first to third features (1) to (3), the spring member comprises a hollow member which has a central bore extending therethrough in a direction in which the hollow member projects away from the holding member toward the other suspension member, and wherein the hollow member has at least one communication groove which is formed in an end surface of the base end portion of the hollow member so as to extend radially from the central bore to an outer peripheral edge of the end surface and is further continuously formed in an outer surface of the base end portion so as to extend axially from the outer peripheral edge to an outside space of the holding member, so that the central bore is communicated with the outside space.

In the present bumper stopper, the central bore can be utilized for attaching the bumper stopper to a suspension member, or for externally fitting the same on a piston rod of a shock absorber. The size of the central bore can be changed for the purpose of tuning the spring characteristic of the spring member. Even when the other suspension member bumps against the free end surface of the spring member and closes the central bore, the central bore is kept in communication with the outside space via the communication groove. That is, when the volume of the central bore is changed by the compression of the spring member, air is allowed to move between the central bore and the outside space. Thus, the spring member is allowed to deform elastically in a stable manner. In addition, harmful noise such as noise caused by compression of the air is prevented. Moreover, since the spring member has the central bore, it does not swell radially outwardly so much when being compressed, and does not interfere with the stopper rubber and/or other members. The spring member may have either a single communication groove, or a plurality of communication grooves.

(5) According to a fifth feature of the present invention that includes any one of the first to fourth features (1) to (4), the stopper rubber has a hollow shape and is continuously formed on the end surface of the hollow holding portion of the holding member.

In the present bump stopper, the stopper rubber is prevented from abnormally deforming, e.g., buckling. Therefore, the spring member enjoys a stable spring characteristic and a high durability. Although the stopper rubber is advantageously formed to have a hollow shape, it is possible that the stopper rubber be provided by a plurality of projecting blocks which are separate from one another in a circumferential direction of the hollow holding portion of the holding member. Otherwise, the stopper rubber may have a tapered shape whose diameter decreases toward its free end surface. The spring characteristic of the stopper rubber may be adjusted by forming one or more recesses in the inner and/or outer surfaces of the stopper rubber. Each stopper rubber exhibits an excellent shock absorbing effect. The stopper rubber may have, on its free end surface, a plurality of elastic projections which are separate from each other in its circumferential direction and which are formed integrally with the stopper rubber. Those elastic projections reduce or prevent noise and/or impact which would be produced when the other suspension member bumps against the stopper rubber.

(6) According to a sixth feature of the present invention that includes any one of the first to fifth features (1) to (5), the spring member has at least one circumferential groove which is formed in an outer circumferential surface thereof in a circumferential direction thereof.

In the present bump stopper, the one or more circumferential grooves contribute to causing the spring member to be compressed stably in the direction in which the spring member projects from the one suspension member toward the other suspension member, and causing the spring member to exhibit stably a desired spring characteristic. In addition, the spring member is prevented from abnormally deforming, e.g., buckling. Thus, the spring member enjoys a high durability. The spring member may have a plurality of outer circumferential grooves which are separate from each other in the above direction. In the latter case, if the spring member has a central bore according to the fourth feature (4) and a plurality of inner circumferential grooves formed in an inner surface thereof in the circumferential direction thereof, it is preferred that the outer circumferential grooves are alternate with the inner circumferential grooves in the above direction. Since in the last case the spring member has a bellows structure, it can be compressed more stably in that direction.

(7) According to a seventh feature of the present invention that includes any one of the first to sixth features (1) to (6), a percentage of a length of projection of the spring member from the free end surface of the stopper rubber relative to an overall length of the spring member is not greater than 75%.

In the present bump stopper, the spring member is prevented from receiving an excessively large load, or from being excessively compressed. Thus, the bump stopper enjoys a high durability. More preferably, the bump stopper is designed such that because the holding portion of the holding member butts against the other suspension member via the stopper rubber, the maximum compression amount of the spring member is limited to not greater than 75%.

(8) According to an eighth feature of the present invention that includes any one of the first to seventh features (1) to (7), the stopper rubber is formed of a non-foamed rubber, and has a first spring constant greater than a second spring constant of the spring member.

The present bump stopper advantageously exhibits a desired non-linear spring characteristic. A non-foamed rubber used to form the stopper rubber may be selected depending upon the requirements of the product, for example, the maximum input load or the circumstances under which the product is used. However, the non-foamed rubber is not limited to any specific sorts of rubber. On the other hand, a foamed elastic material used to form the spring member may be selected from various known materials, so long as its volume is easily decreased when being compressed. For example, according to this feature the spring member is formed of a urethane foam.

(9) According to a ninth feature of the present invention that includes any one of the first to eighth features (1) to (8), the bump stopper further comprises a restraint ring which fits on an intermediate portion of the spring member as seen in a direction in which the spring member projects away from the holding member toward the other suspension member, such that the restraint ring extends on an outer circumferential surface of the spring member in a circumferential direction thereof.

In the present bump stopper, the spring member itself exhibits a non-linear spring characteristic. Thus, the bump stopper as a whole more advantageously exhibits a non-linear spring characteristic. Since free elastic deformation of the spring member is not allowed by the restraint ring, the spring member is compressed while maintaining a stable shape, which leads to exhibiting a stable spring characteristic. However, the bump stopper need not employ a restraint ring. In the latter case, the bump stopper is free from the problem that when the spring member is compressed, stresses occur locally to the place where the ring is provided. Even if the bump stopper employs the restraint ring, stresses are not excessively concentrated at the ring because the stopper rubber effectively limits the amount of elastic deformation of the spring member. Thus, the bump stopper enjoys a high durability. Preferably, the shape and size of the restraint ring are selected such that the ring does not butt on the stopper rubber or the holding member when the spring member is compressed.

BRIEF DESCRIPTION OF THE DRAWINGS

The above and optional objects, features and advantages of the present invention will be better understood by reading the following detailed description of the preferred embodiments of the invention when considered in conjunction with the accompanying drawings, in which:

FIG. 1 is a longitudinal cross section view of a bump stopper as a first embodiment of the present invention, as viewed in the same direction as that in which

FIG. 2 is a longitudinal cross section view of a spring member of the bump stopper of FIG. 1, taken along 2—2 in FIG. 3;

FIG. 6 is a longitudinal cross section view of another bump stopper as a second embodiment of the present invention, as viewed in the same direction as that in which

FIG. 7 is a longitudinal cross section view of a spring member of the bump stopper of FIG. 6, taken along 7—7 in FIG. 8;

DETAILED DESCRIPTION OF THE PREFERRED EMBODIMENTS

Referring to FIGS. 1 to 5, there will be described a bump stopper 10 as a first embodiment of the present invention.

Figure 1:
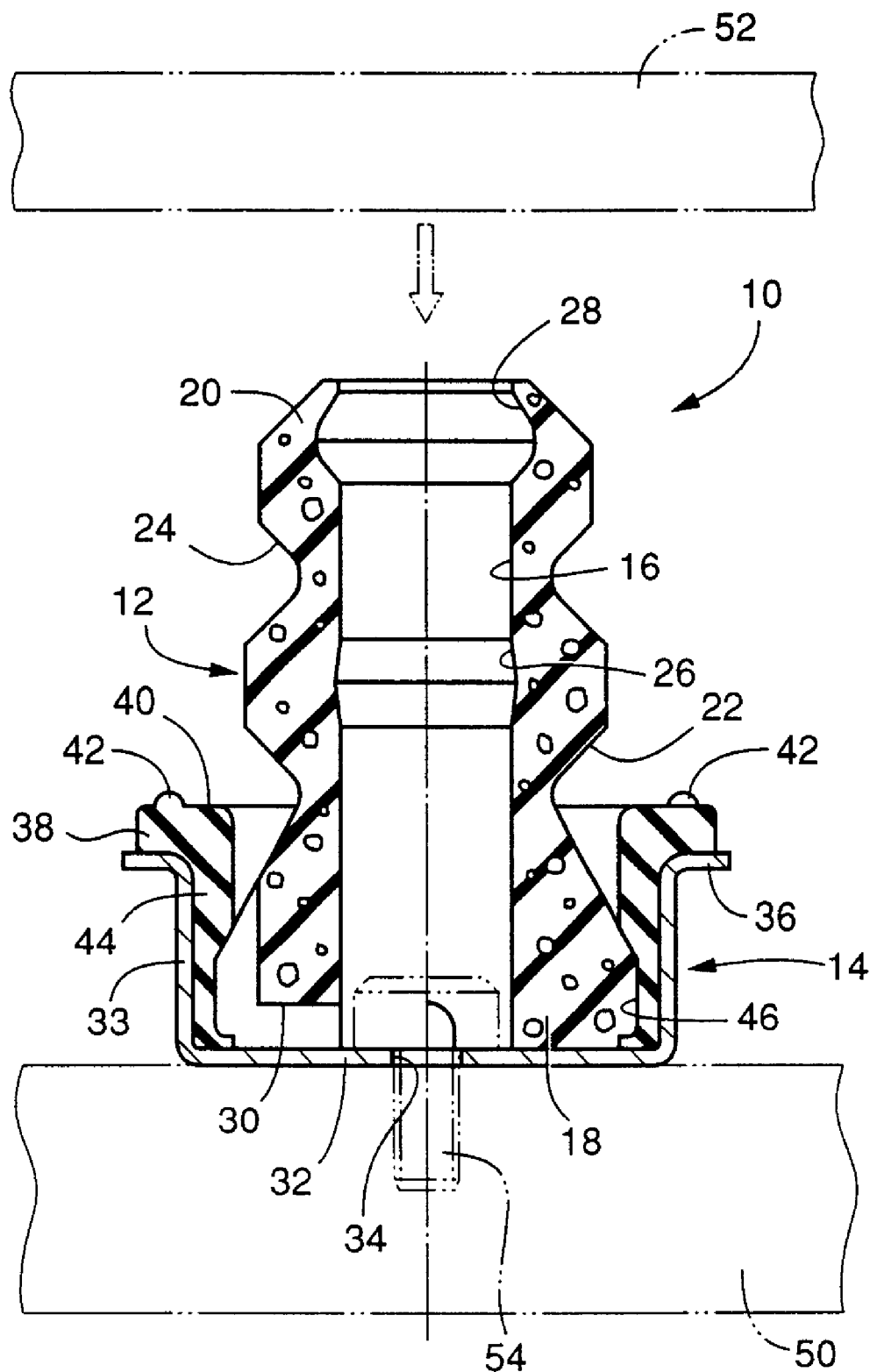

As shown in FIG. 1, the bump stopper 10 includes a spring body or member 12, and a rigid holding member 14 formed of metal. The spring member 12 and the holding member 14 are assembled into the bump stopper 10.

Figure 2:
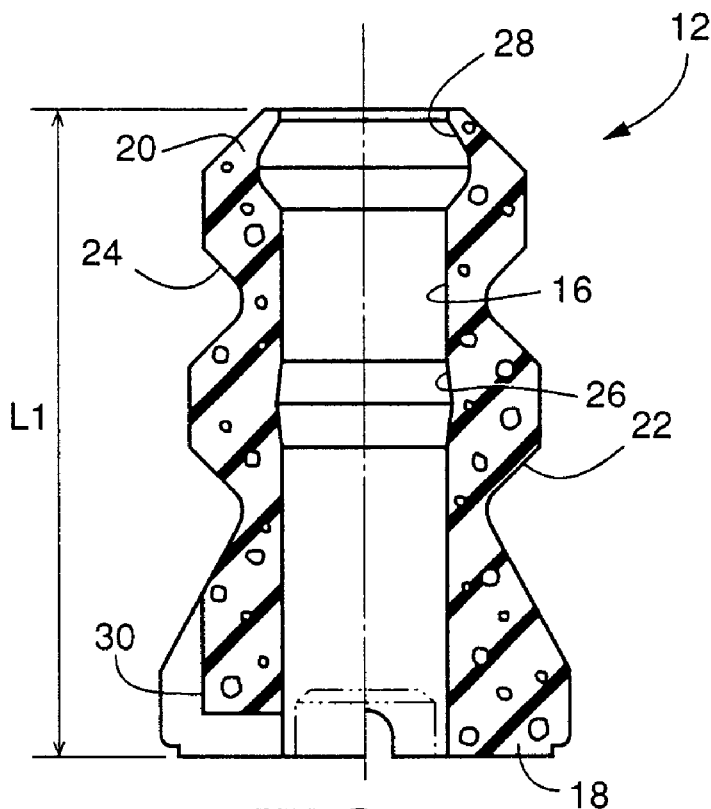
FIG. 2 is viewed.
Figure 3:
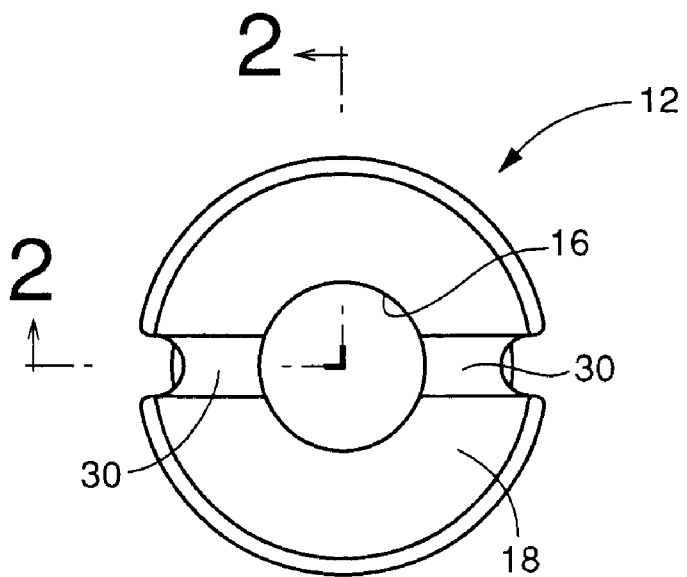
FIG. 3 is a bottom view of the spring member of FIG. 2.

As shown in FIGS. 2 and 3, the spring member 12 has a generally cylindrical, hollow shape with a thick wall. The spring member 12 has a central bore 16 extending therethrough along its center axis. The outer diameter of one of the axially opposite end portions of the spring member 12 (i.e., the lower end portion as viewed in FIG. 2) increases in a direction toward the lower end surface of the spring member 12. Thus, the lower end portion provides a base end portion 18 having the greatest outer diameter. Meanwhile, the outer diameter of the other or upper end portion of the spring member 12 decreases in the axial direction toward the upper end surface of the spring member 12. Thus, the upper end portion provides a free end portion 20 having the smallest outer diameter.

The spring member 12 has a first and a second outer circumferential groove 22, 24 each of which is formed in an outer circumferential surface of the spring member 12 so as to open in the outer surface and extend continuously in a circumferential direction of the spring member 12. Each of the two outer grooves 22, 24 has a generally V-shaped cross section opening radially outwardly. The two outer grooves 22, 24 are formed in an intermediate portion of the spring member 12 as viewed in the axial direction of the spring member 12, such that the two outer grooves 22, 24 are separate from each other in the axial direction. Meanwhile, the spring member 12 has a first and a second inner circumferential groove 26, 28 each of which is formed in an inner circumferential surface of the spring member 12 so as to open in the inner surface and extend continuously in the circumferential direction of the spring member 12. Each of the two inner grooves 26, 28 has a generally V-shaped cross section opening radially inwardly. The first outer groove 22, the first inner groove 26, the second outer groove 24, and the second inner groove 28 are alternate with one another in the axial direction of the spring member 12, such that the four grooves 22, 26, 24, 28 are separate from one another in the axial direction. Thus, the spring member 12 as a whole except the base end portion 18 provides a bellows structure with a thick wall. The thickness of the wall of the spring member 12 gradually decreases in the axial direction of the spring member 12 from the base end portion 18 toward the free end portion 20. Thus, the spring characteristic of the spring member 12 changes, i.e., becomes softer in the axial direction from the base end portion 18 toward the free end portion 20.

The base end portion 18 of the spring member 12 has a thick-wall structure having the greatest outer diameter over a predetermined length in the axial direction of the spring member 12. The base end portion 18 has two straight communication grooves 30 each of which is formed in the lower end surface of the spring member 12 so as to extend radially from the central bore 16 to an outer peripheral edge of the lower end surface. The two grooves 30 are diametrically opposite to each other with respect to the central bore 16, as shown in FIG. 3. However, the spring member 12 may have one, three, or more communication grooves 30. Each communication groove 30 is further continuously formed in an outer circumferential surface of the base end portion 18 so as to extend in the axial direction of the spring member 12 and open in the first outer circumferential groove 22 of the same 12. Thus, the central bore 16 communicates with the first outer groove 22 via the communication grooves or passages 30.

The spring member 12 is provided by a foamed elastic material or body, preferably, urethane foam obtained by reaction of a raw material for polyurethane.

Figure 4:
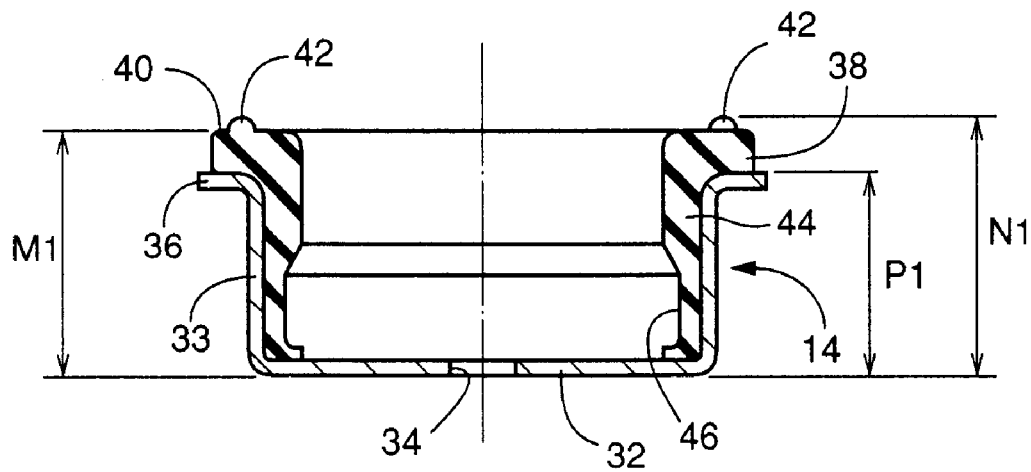
FIG. 4 is a longitudinal cross section view of a holding member of the bump stopper of FIG. 1, taken along 4—4 in FIG. 5.
Figure 5:
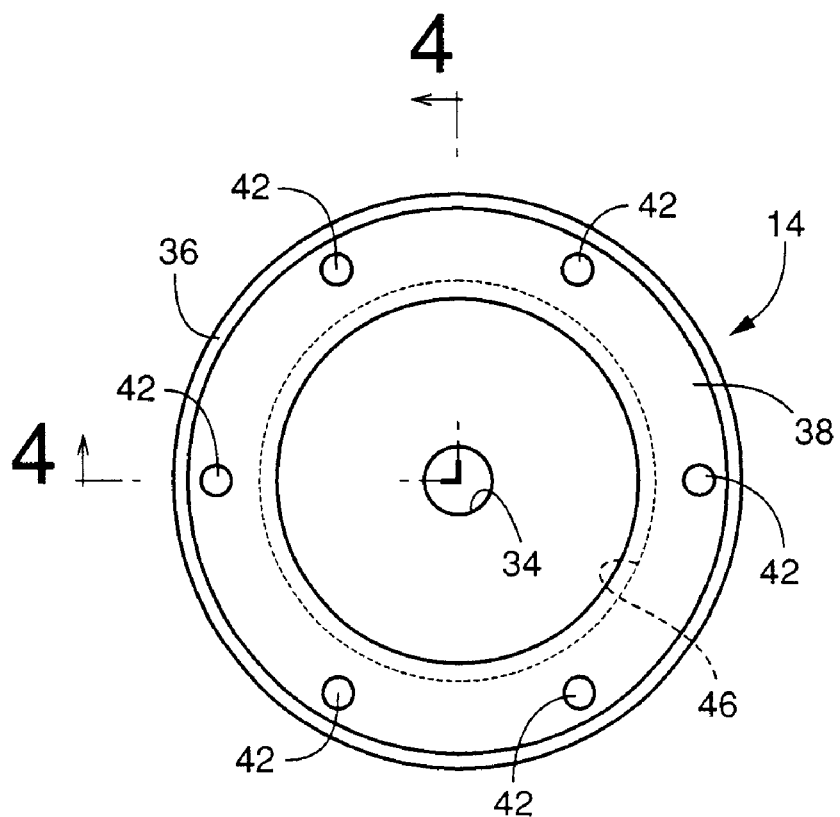
FIG. 5 is a plan view of the holding member of FIG. 4.

As shown in FIGS. 4 and 5, the metallic holding member 14 has a cylindrical shape with a bottom wall 32. The bottom wall 32 has a central hole 34 formed therethrough. The holding member 14 includes a cylindrical wall 33, and a flange portion 36 projecting radially outwardly from an open end of the cylindrical wall 33. The flange portion 36 has a substantially constant width and continuously extends in a circumferential direction of the holding member 14.

The metallic holding member 14 is obtained by drawing (e.g., press working) of a sheet or plate of a metal such as iron or the like. However, the holding member 14 may be formed of any suitable rigid material, e.g., a hard synthetic resin.

A stopper rubber 38 is provided on, and fixed to, the flange portion 36 of the holding member 14 that provides an end surface of the holding member 14, such that the stopper rubber 38 projects axially outwardly from the holding member 14. The stopper rubber 38 has a cylindrical shape, and is adhered to the flange portion 36 so as to cover substantially entirely the same 36. The stopper rubber 38 has, on a free end surface 40, a plurality of elastic projections 42 (six projections 42 in the present embodiment) each of which has a generally semi-spherical shape and which are separate from one another in a circumferential direction of the stopper rubber 38. The elastic projections 42 are integrally formed with the stopper rubber 38.

A holding rubber layer 44 is provided on, and fixed to, an inner circumferential surface of the cylindrical wall 33 of the holding member 14. The holding rubber layer 44 is adhered to the inner circumferential surface of the cylindrical portion 33 so as to cover entirely the inner surface. In the present embodiment, the holding rubber layer 14 is integrally formed with the stopper rubber 38 and the projections 42. It is preferred that the holding member 14 is placed in a molding block for forming those elements 44, 38, 42 and a rubber material is vulcanized in the block so as to be simultaneously adhered to the holding member 14. Thus, the holding member 14, the stopper rubber 38, the projections 42, and the holding rubber layer 44 are provided as an integral vulcanized product.

The holding rubber layer 44 has, in a half portion thereof on the side of the bottom wall 32 of the holding member 14, an engaging groove 46 which extends continuously in a circumferential direction of the rubber layer 44. The inner circumferential surface of the engaging groove 46 has a shape corresponding to that of the outer circumferential surface of the base end portion 18 of the spring member 12. Therefore, as shown in FIG. 1, the base end portion 18 of the spring member 12 is fitted in, and engaged with, the engaging groove 46 of the rubber layer 44, by forcibly pressing the base end portion 18 into the holding member 14. The base end portion 18 provides an engaging projection which is engageable with the engaging groove 46 so as to prevent the spring member 12 from coming off the holding member 14. Thus, the spring member 12 is stably and safely held by the holding member 14.

The spring member 12 has, in its axial direction, a length, L1 (FIG. 2), greater than a height, M1 (FIG. 4), of the free end surface 40 of the stopper rubber 38, that is, L1>M1. It is preferred that the ratio, N1/L1, of a height, N1, of the elastic projections 42 to the length L1 is not smaller than 0.25. More preferably, the ratio, P1/L1, of an axial length, P1, of the holding member 14 to the length L1 is not smaller than 0.25. In the illustrated embodiment, the ratio, M1/L1, of the height M1 to the length L1 is prescribed at about 0.4.

The bump stopper 10 constructed as described above is provided between two suspension members 50, 52 (FIG. 1) of a suspension system of an automotive vehicle that are moved toward, and away from, each other upon operation of the suspension system, and is attached to one 50 of the two suspension members 50, 52 with the help of a bolt 54, as shown in FIG. 1. In the present embodiment, after the spring member 12 is assembled with the holding member 14, the bolt 54 is passed first through the central bore 16 of the spring member 12 and then through the central hole 34 of the bottom wall 32 of the holding member 14 and finally is screwed into, and engaged with, the one suspension member 50. However, alternatively, it is possible that after the holding member 14 is attached to the one suspension member 50 with the bolt 54, the spring member 12 be fitted in, and engaged with, the holding member 14.

In the state in which the bump stopper 10 is attached to the one suspension member 50, the spring member 12 projects in a direction from the one suspension member 50 toward the other suspension member 52, such that the free end portion 20 of the spring member 12 is opposed to, and separate from, the other suspension member 52. The bump stopper 10 is positioned relative to the two suspension members 50, 52, and is attached to the one suspension member 50, such that the center axis of the bump stopper 10 extends substantially parallel to a direction in which the two suspension members 50, 52 are moved toward, and away from, each other upon operation of the suspension system. In this state, when the two suspension members 50, 52 are moved toward each other upon operation of the suspension system, first, the other suspension member 52 bumps against the spring member 12, thereby deforming and compressing the same 12 in its axial direction. During this, the other suspension member 52 does not bump on the stopper rubber 38 yet, and only the spring member 12 is compressed. Since only the spring member 12 is functioning as a compression spring, the bump stopper 10 exhibits a soft spring characteristic. As the amount of operation of the suspension system increases and accordingly the amount of compression of the spring member 12 increases, the other suspension member 52 bumps against not only the spring member 12 but also the stopper rubber 38. Consequently, the spring member 12 and the stopper rubber 38 cooperate with each other to function as a compression spring which has a much greater spring constant and exhibits a much harder spring characteristic.

Thus, the bump stopper 10 exhibits a soft spring characteristic while the amount of operation of the suspension system is small, and exhibits a much harder spring characteristic when the amount of operation of the suspension system exceeds a predetermined amount. Therefore, the bump stopper 10 prevents an excessive operation amount of the suspension system, that is, an excessive displacement of the vehicle's body in its rolling direction. That is, the bump stopper 10 contributes to assuring high riding quality in a vehicle's normal running state and improving vehicle's stability and controllability.

The spring member 12 and the stopper rubber 38 share various requirements to the bump stopper 10, including a shock-absorbing function. More specifically described, since the spring member 12 has a soft spring characteristic, the bump stopper 10 assists the suspension system in supporting, elastically, wheels, while assuring the riding quality in the vehicle's normal running state. That is, during an initial phase of the operation of the bump stopper 10 as a stopper for limiting the amount of operation of the suspension system, the spring member 12 exhibits the shock-absorbing function. In addition, since the amount of projection of the stopper rubber 38 is not so great, the stopper rubber 38 is free of the problem of buckling and the bump stopper 10 functions as a stopper for limiting effectively the amount of operation of the suspension system. In particular, since the stopper rubber 38 is provided on the flange portion 36 of the rigid holding member 14, the amount of movement of the two suspension members 50, 52 relative to each other is effectively limited by the cylindrical wall 33 of the holding member 14.

In the present embodiment, the stopper rubber 38 has a cylindrical shape and continuously extends over the flange portion 36 of the holding member 14. Therefore, the stopper rubber 38 is effectively prevented from being irregularly deformed, e.g., buckling. The elastic projections 42 provided on the free end surface 40 of the stopper rubber 38 contribute to reducing or preventing noise which is produced when the other suspension member 52 bumps against the stopper rubber 38. In addition, owing to the elastic projections 42, the passengers riding in the vehicle also feel less impact when the suspension member 52 bumps against the stopper rubber 38.

Since the spring member 12 is provided by a foamed elastic material, the volume of the spring member 12 is easily decreased when being compressed. Therefore, the spring member 12 is effectively prevented from being irregularly deformed, e.g., buckling, and is stably deformed or compressed in its axial direction. As the amount of compression of the spring member 12 is increased, the volume of the same 12 is so decreased as to be accommodated in the inside space of the stopper rubber 38 and the holding member 14. Thus, the spring member 12 is prevented from swelling radially outwardly to interfere with other members or obstructing the other suspension member 52 from bumping on the stopper rubber 38. In particular, since the spring member 12 has the central bore 16, the spring member 12 is allowed to swell radially inwardly. Thus, the spring member 12 is effectively prevented from swelling radially outwardly.

The bump stopper 10 does not employ a restraint ring fitted on the spring member 12. Therefore, the spring member 12 is free of the problem that when the spring member 12 is deformed or compressed, stresses are locally concentrated at the position where the restraint ring is provided. In addition, since the amount of compression of the spring member 12 is reliably limited by the limitation of the operation amount of the suspension system by the bumping of the other suspension member 52 against the stopper rubber 38 and the cylindrical wall 33 of the holding member 14, the greatest stress occurring to the spring member 12 is prevented from exceeding an upper limit. Thus, the bump stopper 12 enjoys a high durability.

The central bore 16 of the spring member 12 is kept in communication with the outside space of the spring member 12, via the communication grooves or passages 30 each of which is defined by the base end portion 18 of the spring member 12, the bottom wall 32 of the holding member 14, and the holding rubber layer 44, and via the opening of the cylindrical stopper rubber 38. Thus, air is allowed to move between the central bore 16 and the outside space. Even if the spring member 12 is elastically deformed in the state in which the other suspension member 52 bumps against the free end portion 20 of the spring member 12 and thereby closes the opening of the central bore 16, the volume of the central bore 16 is easily changed. Thus, the spring member 12 is effectively prevented from being damaged due to otherwise increased air pressure in the central bore 16, and accordingly, exhibits the expected stable spring characteristic. In addition, since air is smoothly moved between the central bore 16 and the outside space, harmful noise is not generated.

While the present invention has been described by reference to the bump stopper 10 as its preferred embodiment, the stopper 10 is just an example of the present invention, which is by no means limited to the details thereof.

In particular, the materials used for forming the spring member 12 and the stopper rubber 38 and/or the shapes and sizes of those elements 12, 38 may be arbitrarily selected or determined depending upon the requirements to the bump stopper 10.

Next, referring to FIGS. 6 to 10, there will be described a bump stopper 60 as a second embodiment of the present invention. The same reference numerals as used for the first embodiment shown in FIGS. 1 to 5 are used to designate the corresponding elements and parts of the second embodiment shown in FIGS. 6 to 10, for easier understanding purposes only.

Figure 7:
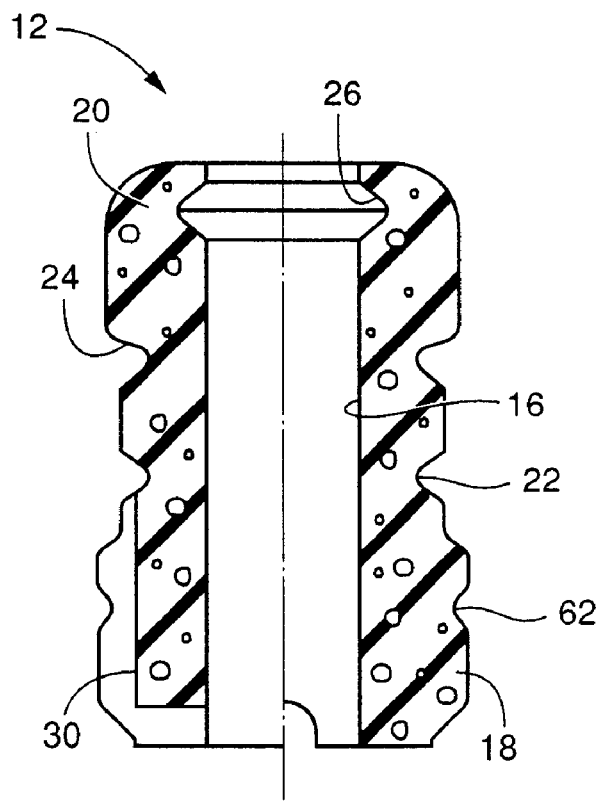
FIG. 7 is viewed.
Figure 8:
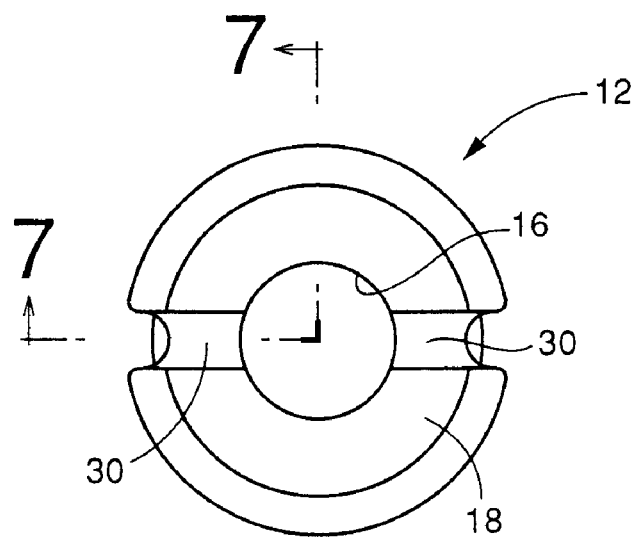
FIG. 8 is a bottom view of the spring member of FIG. 7.

The bump stopper 60 includes a spring member 12. As shown in FIGS. 7 and 8, the spring member 12 has a generally cylindrical shape with a thick wall. The spring member 12 includes a free end portion 20 having an outer diameter slightly greater than that of a middle portion of the spring member 12, and additionally includes a base end portion 18 having an outer diameter slightly greater than that of the free end portion 20. The spring member 12 has a first and a second outer circumferential groove 22, 24 which are separate from each other in an axial direction of the spring member 12. The free end portion 20 has, in its inner circumferential surface, an inner circumferential groove 26. Thus, the spring characteristic of the spring member 12 in its axial direction is adjusted to be soft. The base end portion 18 has, in its outer circumferential surface, an annular engaging groove 62 which continuously extends in a circumferential direction of the spring member 12.

Figure 9:
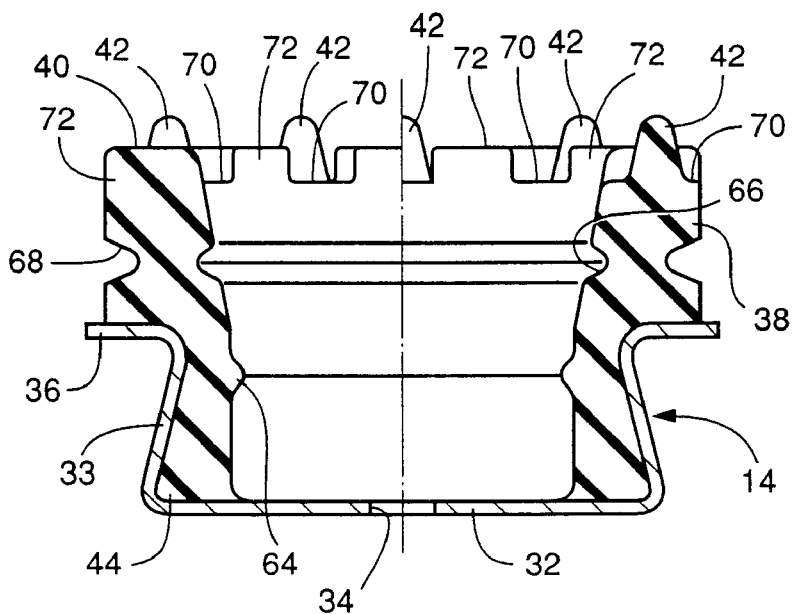
FIG. 9 is a longitudinal cross section view of a holding member of the bump stopper of FIG. 6, taken along 9—9 in FIG. 10.
Figure 10:
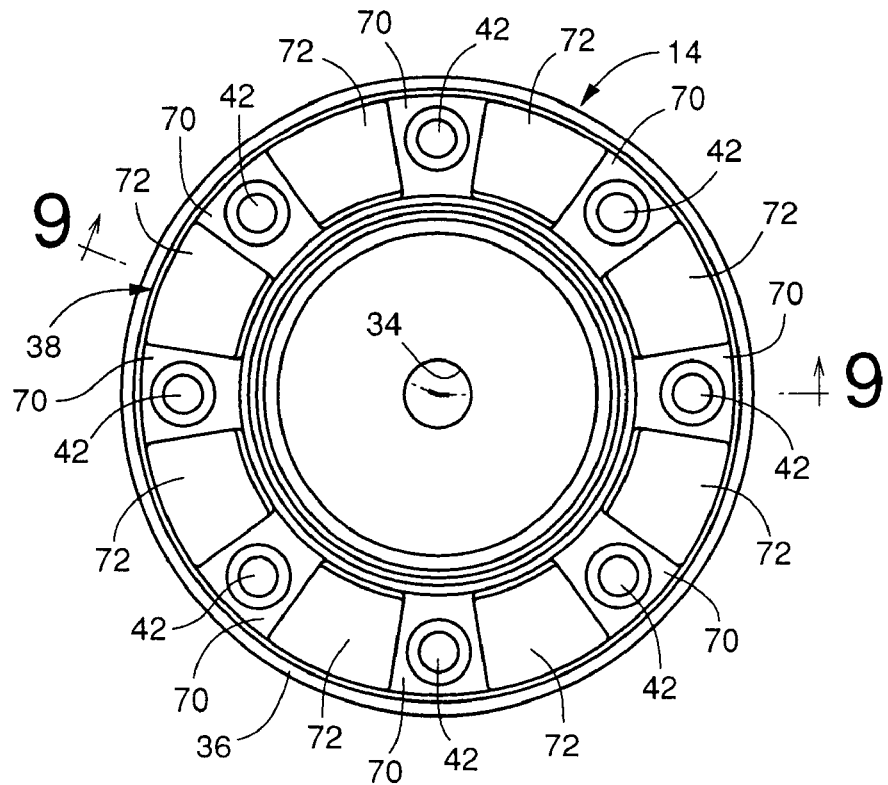
FIG. 10 is a plan view of the holding member of FIG. 9.

The bump stopper 60 further includes a metallic holding member 14 (see FIG.9). As shown in FIGS. 9 and 10, the holding member 14 includes a generally cylindrical, slightly tapered side wall 33. The diameter of the tapered side wall 33 slightly decreases in a direction from a bottom wall 32 of the holding member 14 toward an open end of the same 14. The tapered side wall 33 is obtained by drawing. This arrangement enables the width of a flange portion 36 to be increased without the outer diameter of the same 36 being changed.

Figure 6:
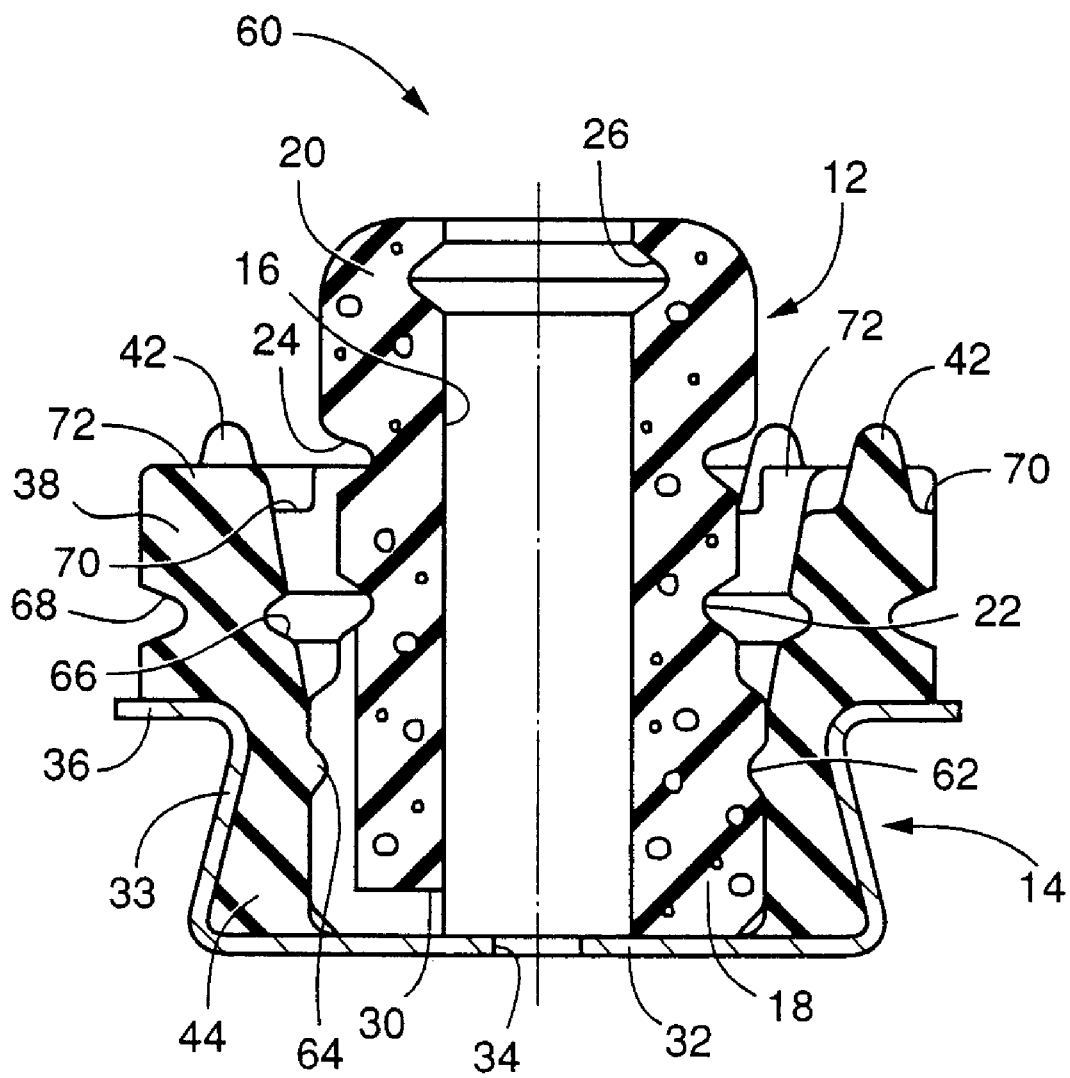

A holding rubber layer 44 is adhered to an inner circumferential surface of the tapered side wall 33, and has, on its inner circumferential surface, an annular engaging ridge or projection 64 which continuously extends in a circumferential direction of the rubber layer 44. The annular projection 64 is formed integrally with the rubber layer 44. As shown in FIG. 6, when the spring member 12 is fitted in the holding member 14, the annular projection 64 of the rubber layer 44 is fitted in, and engaged with, the annular groove 62 of the spring member 12, so that the spring member 12 is engaged with the holding member 14. That is, the annular groove 62 and the annular projection 64 cooperate with each other to prevent the spring member 12 from coming off the holding member 14.

With reference to FIG. 9, a stopper rubber 38 is provided on the flange portion 36 of the holding member 14, such that the stopper rubber 38 projects from the flange portion 36 toward the other suspension member 52 over a length greater than that over which the stopper rubber 38 of the first bump stopper 10 projects. The inner diameter of the stopper rubber 38 increases in a direction toward a free end surface 40 thereof. That is, the thickness of the wall of the stopper rubber 38 decreases in the direction toward the free end surface 40. The stopper rubber 38 has, in its inner and outer circumferential surfaces, two groove-like recesses 66, 68, respectively, each of which extends in a circumferential direction of the stopper rubber 38. Thus, a compression-spring characteristic of the stopper rubber 38 in its axial direction is adjusted. In addition, the stopper rubber 38 has, in the free end surface 40 thereof, a plurality of recesses 70 and a plurality of projecting portions 72 which alternate with one another in the circumferential direction of the stopper rubber 38. An elastic projection 42 having a generally truncated conical shape and a hemispherical free end portion projects from a central portion of each of the recesses 70, in the same direction as that in which the stopper rubber 38 projects from the flange portion 36. The projections 42 are formed integrally with the stopper rubber 38. Since a length of projection of the elastic projections 42 is greater than the dimension of a step between each recess 70 and each projecting portion 72, a free end portion of each elastic projection 42 projects axially outwardly over the projecting portions 72.

The second bump stopper 60 constructed as described enjoys the same advantages as those of the first bump stopper 10 shown in FIGS. 1 to 5. In addition, since in the second bump stopper 60 more than half the overall length of the spring member 12, in its axial direction, is surrounded by the stopper rubber 38 and the tapered side wall 33 of the holding member 14, the spring member 12 is more effectively prevented from abnormally deforming, such as buckling, or locally swelling radially outwardly, and accordingly is more stably compressed. Moreover, as compared with the first bump stopper 10, the spring member 12 has a thicker wall, and the stopper rubber 38 projects a longer distance from the flange portion 36 of the holding member 14. Therefore, when the other suspension member 52 is moved toward the one suspension member 50 and the distance between the two suspension members 50, 52 is decreased, the spring characteristic of the bump stopper 60 changes in a more moderate manner. Thus, the bump stopper 60 exhibits an excellent shock absorbing effect. Furthermore, since in the second bump stopper 60 the stopper rubber 38 has, in the free end surface 40 thereof, the alternate recesses 70 and projecting portions 72, and also has the elastic projections 42 larger than those 42 employed in the first bump stopper 10, the spring characteristic of the bump stopper 60 moderately changes from a soft or low range in which the spring member 12 is compressed, to a hard or high range in which the stopper rubber 38 is compressed, via a transitional range in which the abrupt change of the spring characteristic is moderated by the elastic deformation of the projecting portions 72 and the elastic projections 42.

Each of the first and second bumper stoppers 10 60 includes the generally cylindrical, hollow spring member 12. However, according to the concept of the present invention, it is possible to employ, in place of the hollow spring member 12, a solid spring member. In the latter case, an internally threaded member such as a nut may be fixed to the holding member 14, so that either bump stopper 10 or 60 can be attached to the one suspension member 50 with a bolt. Alternatively, the holding member 14 may be welded to the one suspension member 50. Otherwise, the holding member 14 may be provided with a plurality of "ear" portions which can be fixed to the one suspension member 50.

In the case where the spring member 12 of the bump stopper 10 or 60 has no central bore 16, communication grooves or passages 30 (see FIGS. 1–5) are not needed.

In the case where the spring member 12 of the bump stopper 10 or 60 has the central bore 16, it is possible to form, in place of the communication grooves 30 (see FIGS. 1–5), one or more communication grooves in the holding member 14 and/or the holding rubber layer 44, so that the one or more communication grooves cooperate with the spring member 12 to define one or more communication passages between the central bore 16 and the outside space of the bump stopper 10 or 60.

The stopper member 38 of the bump stopper 10 or 60 may be formed of a foamed elastic material such as urethane foam.

In a particular case where the side wall 33 of the holding member 14 of the bump stopper 10 or 60 has a sufficiently great thickness and accordingly a free end surface of the side wall 33 has a sufficiently great width, the holding member 14 does not need the flange portion 36.

It is to be understood that the present invention may be embodied with other changes, modifications, and improvements that may occur to one skilled in the art without departing from the spirit and scope of the invention defined in the appended claims.

What is claimed is:

1. A bump stopper for elastically limiting an amount of operation of a suspension system of a vehicle, the bump stopper being provided between two suspension members of the suspension system which are moved toward, and away from, each other upon operation of the suspension system, the bump stopper comprising:

a rigid holding member which is attached to one of the two suspension members and which includes a hollow holding portion opening toward the other suspension member;

a spring member which is formed of a foamed elastic material and which includes a base end portion held by the hollow holding portion of the holding member and also includes a free end portion projecting away from said holding portion toward the other suspension member; and a stopper rubber which is formed of a rubber material different from said foamed elastic material and which projects from an end surface of the hollow holding portion of the holding member toward the other suspension member such that a free end surface of the stopper rubber is more distant from the other suspension member than a free end surface of the spring member, wherein when the other suspension member bumps against the free end surface of the spring member, the spring member is elastically deformed and compressed into an inside space of the stopper rubber, so that the other suspension member bumps against the free end surface of the stopper rubber.

2. A bump stopper according to claim 1, further comprising a holding rubber layer which is formed on an inner surface of the hollow holding portion of the holding member and which has, on an inner surface thereof, one of an engageable projection and an engageable recess engageable with the projection, wherein the spring member has, on an outer surface thereof, the other of the projection and the recess that is engaged with said one of the projection and the recess so as to prevent the spring member from coming off the holding rubber layer.

3. A bump stopper according to claim 1, wherein the holding member comprises a cylindrical metallic member having a bottom wall which supports an end surface of the base end portion of the spring member.

4. A bump stopper according to claim 1, wherein the spring member comprises a hollow member which has a central bore extending therethrough in a direction in which the hollow member projects away from the holding member toward the other suspension member, and wherein the hollow member has at least one communication groove which is formed in an end surface of the base end portion of the hollow member so as to extend radially from the central bore to an outer peripheral edge of said end surface and is further continuously formed in an outer surface of the base end portion so as to extend axially from said outer peripheral edge to an outside space of the holding member, so that said central bore is communicated with said outside space.

5. A bump stopper according to claim 1, wherein the stopper rubber has a hollow shape and is continuously formed on the end surface of the hollow holding portion of the holding member.

6. A bump stopper according to claim 1, wherein the spring member has at least one circumferential groove which is formed in an outer circumferential surface thereof in a circumferential direction thereof.

7. A bump stopper according to claim 1, wherein a percentage of a length of projection of the spring member from the free end surface of the stopper rubber relative to an overall length of the spring member is not greater than 75%.

8. A bump stopper according to claim 1, wherein the rubber material of said stopper rubber comprises a non-foamed rubber, and has a spring constant greater than a spring constant of the spring member.

9. The bump stopper according to claim 1, wherein the rigid holding member further includes a flange portion projecting outwardly from an open end of the hollow holding portion thereof, and wherein the stopper rubber projects toward the other suspension member from a surface of the flange portion that is opposed to the other suspension member.

* * * * *